US006536951B1

United States Patent
Sill

(12) 
(10) Patent No.: US 6,536,951 B1
(45) Date of Patent: Mar. 25, 2003

(54) PLASTIC BAG WITH HEADER FORMED BY OVERLAY STRIP

(75) Inventor: Jonathan D. Sill, Caledonia, OH (US)

(73) Assignee: Inno-Pak, Inc., Delaware, OH (US)

(*) Notice: Subject to any disclaimer, the term of this patent is extended or adjusted under 35 U.S.C. 154(b) by 0 days.

(21) Appl. No.: 09/963,757

(22) Filed: Sep. 26, 2001

(51) Int. Cl.[7] .............................................. B65D 33/14
(52) U.S. Cl. ............................ 383/9; 383/13; 383/64; 383/127
(58) Field of Search .......................... 383/9, 127, 63, 383/64, 16, 87, 81, 82, 86, 89, 13

(56) References Cited

U.S. PATENT DOCUMENTS

| | | | | |
|---|---|---|---|---|
| 3,117,712 A | * | 1/1964 | Kugler | 383/42 |
| 3,744,383 A | * | 7/1973 | Finch et al. | 156/264 |
| 3,974,958 A | | 8/1976 | Rudas | |
| 3,982,574 A | * | 9/1976 | Bianchi et al. | 383/40 |
| 4,734,148 A | * | 3/1988 | Meyer | 156/251 |
| 5,417,495 A | * | 5/1995 | Branson | 383/5 |
| 5,480,230 A | | 1/1996 | May | |
| 5,682,730 A | | 11/1997 | Dobreski | |
| 5,902,045 A | * | 5/1999 | Resteghini | 383/204 |
| 5,931,581 A | * | 8/1999 | Garberg et al. | 383/62 |
| 6,024,489 A | * | 2/2000 | Fox et al. | 206/554 |
| 6,068,584 A | | 5/2000 | Daniels | |
| RE36,876 E | | 9/2000 | Daniels | |
| 6,231,234 B1 | | 5/2001 | Gebhardt | |
| 6,234,673 B1 | * | 5/2001 | Tonoff | 206/806 |
| 6,267,505 B1 | | 7/2001 | Henson | |
| 6,279,298 B1 | | 8/2001 | Thomas | |

FOREIGN PATENT DOCUMENTS

GB        1354954     * 5/1974     ................. 383/127

* cited by examiner

*Primary Examiner*—Jes F. Pascua
(74) *Attorney, Agent, or Firm*—Porter, Wright, Morris & Arthur, LLP

(57) ABSTRACT

A plastic bag includes first and second opposing body panels fixedly connected to each other along a pair of sides and a bottom bridging the pair of sides to form a receptacle space having a mouth formed opposite the bottom. The plastic bag also includes a reclosable fastener extending along said mouth and an overlay strip fixedly connected to the body panels at the sides of the body panel. The overlay strip overlays at least a portion of the body panels and extends beyond the body panels. The overlay strip preferably includes a header portion having at least one opening for mounting the plastic bag to a dispensing post, and a perforation line such that the header is removable from the remainder of the overlay strip. The overlay strip can also have at least one advertisement and/or at least one coupon with perforation lines such that the coupon is removable from the remainder of the overlay strip.

24 Claims, 4 Drawing Sheets

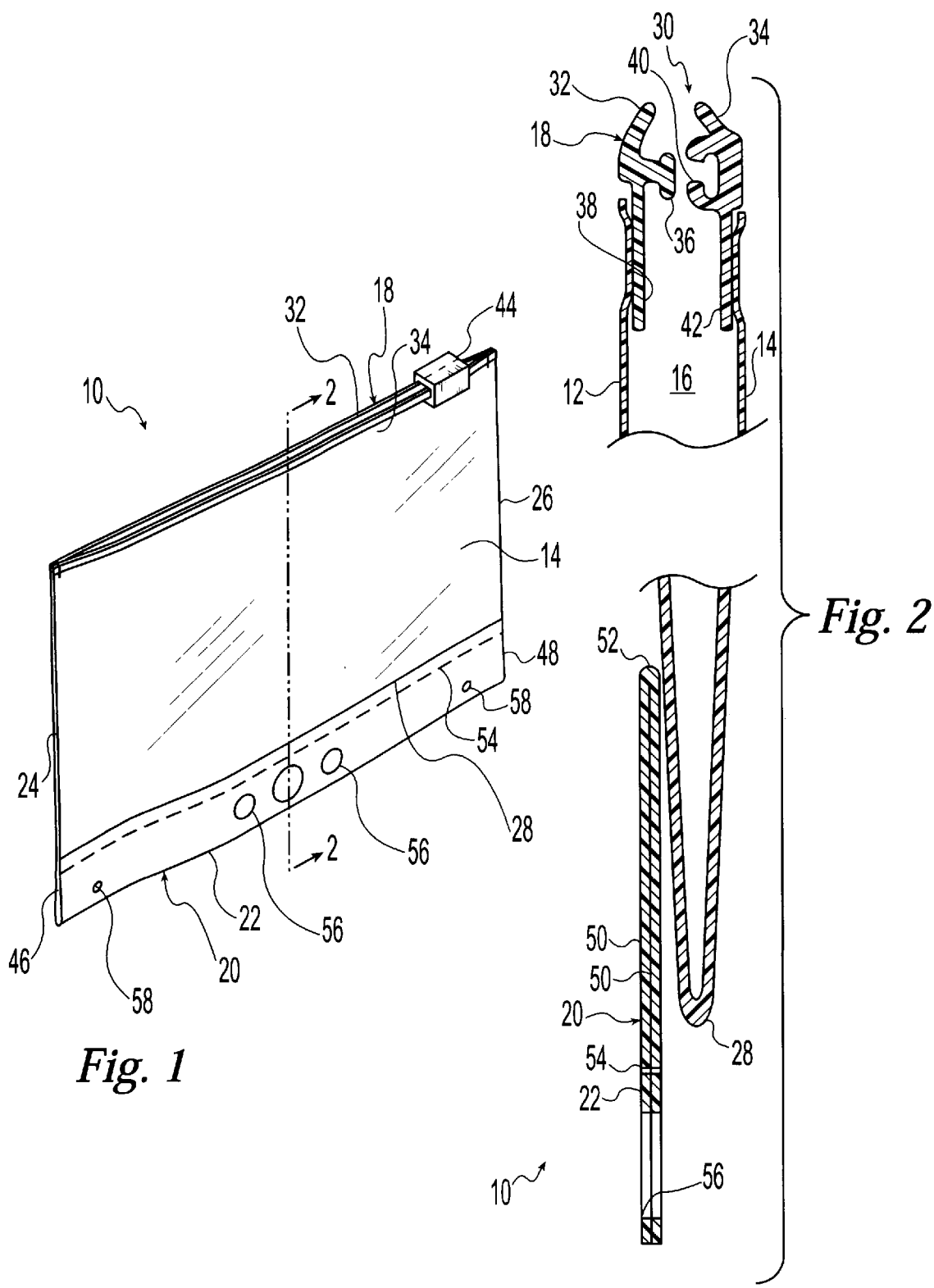

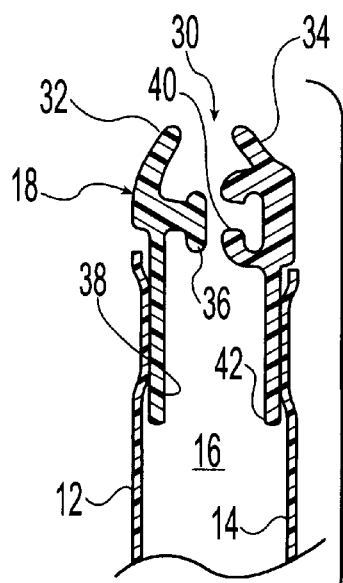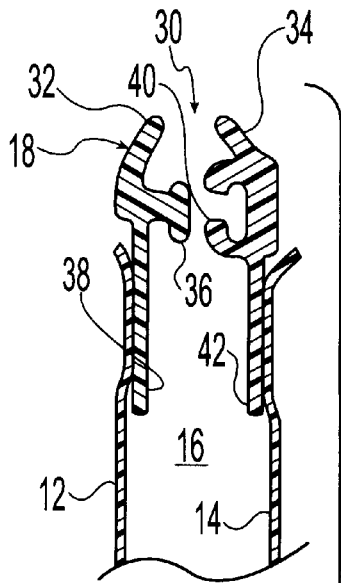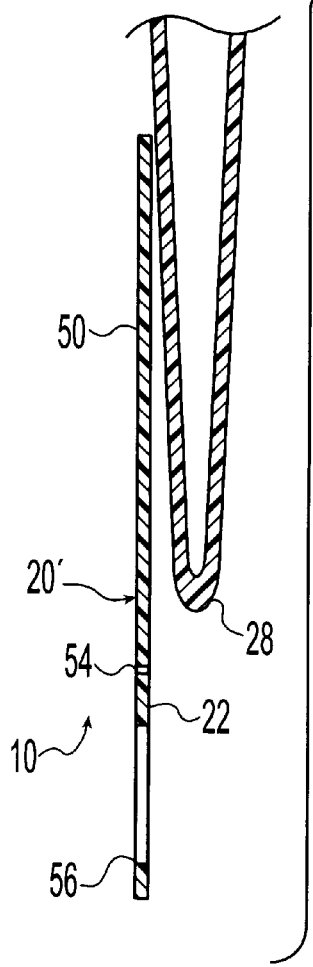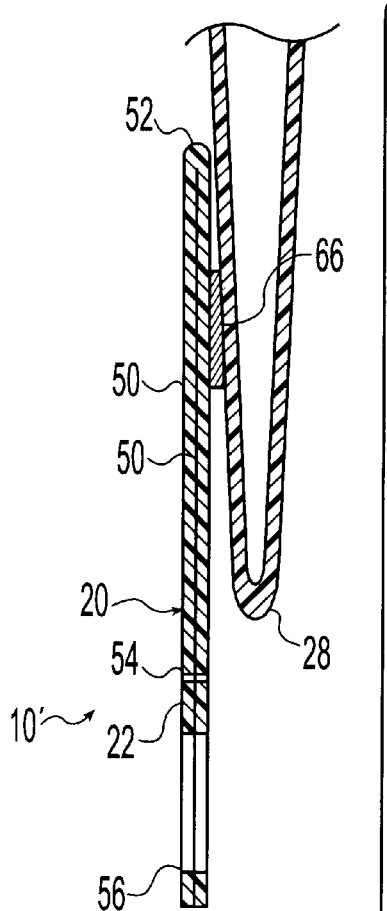
Fig. 5
Fig. 6

PLASTIC BAG WITH HEADER FORMED BY OVERLAY STRIP

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to plastic bags and, more particularly, to plastic bags having headers for mounting the plastic bags on dispensing posts.

BACKGROUND OF THE INVENTION

Deli pouches or bags are plastic bags used for holding and storing cold cuts, cheeses and the like, which are purchased from deli or meat/cheese counters often found in grocery stores. Deli bags are typically formed from translucent high density polyethylene (HDPE), translucent low density polyethylene (LDPE), or translucent linear low density polyethylene (LLDPE). The deli bags are typically manufactured and sold to grocery stores in two basic configurations, saddle packs and header packs.

Saddle packs are formed by securing a number of layers of deli bags together in a stacked arrangement. Each layer of deli bags consists of a central strip of plastic film connecting the top or open ends of two mutually opposing deli-pouches together. A score line or perforation permits each deli bag to be easily separated from the central strip of the plastic film. The stacked layers are typically secured together by heat sealing the central strips at one or more locations.

Header packs are formed be securing a number of stacked deli pouches together at a header. The header is typically formed by a strip of plastic film at the open end. The headers can be secured to a header card which is typically formed of cardboard. A scoreline or perforation permits each deli bag to be easily separated from the respective header.

Reclosable, zippered, deli pouches are finding wide acceptance from customers. Thus there is great demand to manufacture and supply zippered deli bags throughout the grocery industry. Zippered deli pouches are generally manufactured and sold in saddle pack configuration only. One reason is that zippered deli bags cannot be readily stacked registered, and secured in a header pack configuration. In particular, the thickness of a single zippered deli pouch is substantially greater at the zippered open end as compared to the remainder of the deli pouch. Grocery chains with dispensing stands for header packs of deli bags, must incur the cost of switching to saddle pack dispensing stands if they choose to utilize zippered deli bags.

One response has been to form the header as an extension of the bottom of the deli bag so that there is a bottom header. For example, see U.S. Pat. No. 5,682,730 which discloses a plastic bag with bottom header, the disclosure of which is expressly incorporated herein in its entirety. While this may effectively mount header packs of zippered deli-bags, the deli bags may be relatively expensive to produce. Additionally, some individuals may find it awkward to fill and remove the deli bags from the header when they are upside down. Accordingly, there is a need in the art for an improved plastic bag having a header which can be dispensed from conventional header pack stands, is relatively inexpensive to produce, and/or is relatively easy to fill and use.

SUMMARY OF THE INVENTION

The present invention provides a plastic bag which overcomes at least some of the above-noted problems of the related art. According to the present invention, a plastic bag comprises, in combination, first and second opposing body panels fixedly connected to each other along a pair of sides and a bottom bridging the pair of sides to form a receptacle space having a mouth formed opposite the bottom, a reclosable fastener extending along the mouth, and an overlay strip fixedly connected to the body panels at the sides of the body panel. The overlay strip overlays at least a portion of the body panels and extends beyond the body panels.

According to another aspect of the present invention, a plastic bag comprises, in combination, first and second opposing body panels fixedly connected to each other along a pair of sides and a bottom bridging the pair of sides to form a receptacle space having a mouth formed opposite the bottom, a reclosable fastener extending along the mouth, and an overlay strip fixedly connected to the body panels at the sides of the body panel. The overlay strip includes a header portion having at least one opening for mounting the plastic bag to a dispensing post and a perforation line such that the header is removable from the remainder of the overlay strip.

According to yet another aspect of the present invention, a plastic bag comprises, in combination, first and second opposing body panels fixedly connected to each other along a pair of sides and a bottom bridging the pair of sides to form a receptacle space having a mouth formed opposite said bottom, a reclosable fastener extending along the mouth, and an overlay strip fixedly connected to the body panels at the sides of the body panel. The overlay strip overlays at least a portion of the body panels and extends beyond the body panels. The overlay strip includes a header portion having at least one opening for mounting the plastic bag to a dispensing post, a perforation line such that the header is removable from the remainder of the overlay strip, and at least one advertisement.

According to yet another aspect of the present invention, a plastic bag comprising, in combination, first and second opposing body panels fixedly connected to each other along a pair of sides and a bottom bridging the pair of sides to form a receptacle space having a mouth formed opposite the bottom, a reclosable fastener extending along the mouth, an overlay strip fixedly connected to the body panels at the sides of the body panel. The overlay strip overlays at least a portion of the body panels and extends beyond the body panels. The overlay strip includes a header portion with at least one opening for mounting the plastic bag to a dispensing post, at least one coupon, and perforation lines such that both the header and the at least one coupon are separately removable from the remainder of the overlay strip.

From the foregoing disclosure and the following more detailed description of various preferred embodiments it will be apparent to those skilled in the art that the present invention provides a significant advance in the technology and art of plastic bags. Particularly significant in this regard is the potential the invention affords for providing a high quality, reliable, low cost bag which can be utilized with dispensing posts. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 1 is a perspective view of a plastic bag with header formed by an overlay strip according to the present invention;

FIG. 2 is a fragmented cross-sectional view taken along line 2—2 of FIG. 1;

FIG. 5 is a fragmented cross-sectional view similar to FIG. 2 but showing a variation of the plastic bag of FIGS. 1 and 2 wherein the header is formed by a single layer of the overlay strip;

FIG. 6 is a fragmented cross-sectional view similar to FIG. 2 but showing a variation of the plastic bag of FIGS. 1 and 2 wherein the overlay strip is centrally secured to one of the side panels;

Figure 3:
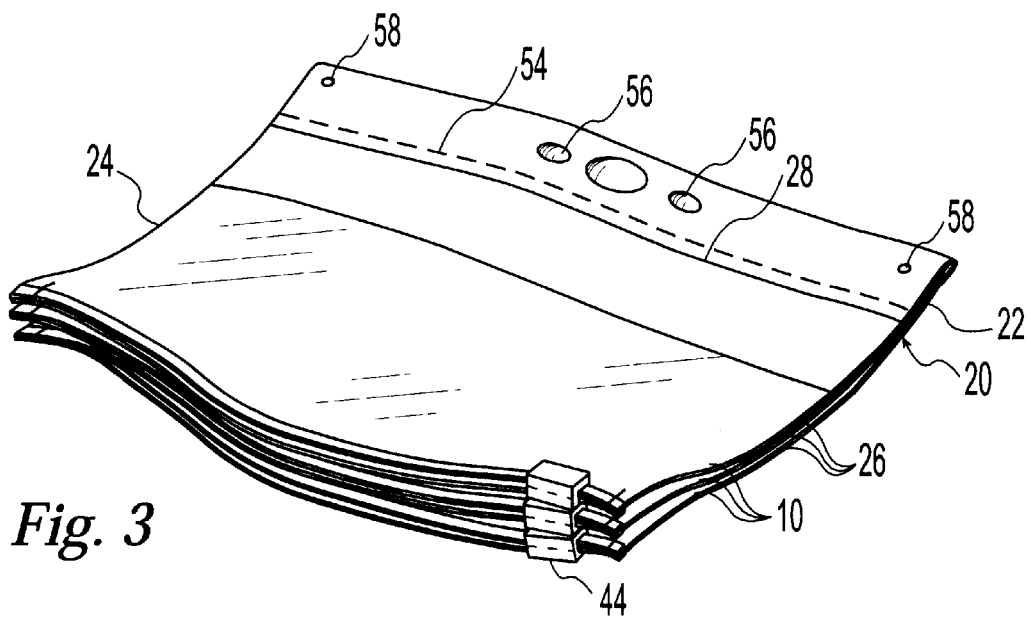
FIG. 3 is a perspective view of a package including a plurality of the plastic bags of FIG. 1.

It should be understood that the appended drawings are not necessarily to scale, presenting a somewhat simplified representation of various preferred features illustrative of the basic principles of the invention. The specific design features of a plastic bag as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the plastic illustrated in the drawings. In general, up or upward refers to an upward direction within the plane of the paper in FIGS. 1 and 2 and down or downward refers to a downward direction within the plane of the paper in FIGS. 1 and 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved plastic bag disclosed herein. The following detailed discussion of various alternative and preferred embodiments will illustrate the general principles of the invention with reference to a plastic bag for use as a deli-bag. Other embodiments suitable for other applications will be apparent to those skilled in the art given the benefit of this disclosure.

Referring now to the drawings, FIGS. 1 and 2 show a plastic bag 10 according to a preferred embodiment of the present invention. The illustrated plastic bag 10 includes first and second opposed body panels 12, 14 forming an interior receptacle space or cavity 16 for storing items, a reclosable fastener 18 for selectively providing access to the interior cavity 16, and an overlay strip 20 forming a header 22 for handling the plastic bag 10.

The first and second body panels 12, 14 are planar, flexible sheets of plastic material. The body panels 12, 14 are fixedly connected to each other along a pair of sides 24, 26 and have a sealed or closed bottom 28 extending between and bridging the sides 24, 26. The sides 24, 26 are preferably thermally fused or welded together but alternatively can be secured in any other suitable manner. The illustrated sealed bottom 28 is formed by a fold between the first and second body panels 12, 14 which are formed by a single sheet or piece of material. Formed in this manner, the body panels 12, 14 form the enclosed interior space 16 which is accessable only through a mouth 30 extending between the sides 24, 26 at the top of the plastic bag 10 and opposite the sealed bottom 28. It is noted that the sealed or closed sides 24, 26 can alternatively be formed in other manners such as, for example, the body panels can be formed by a single sheet of material folded over. It is also noted that the sealed or closed bottom 28 can be formed in other manners such as, for example, the body panels can separate sheets of material fixedly connected at the sealed bottom such as by welding. It is further noted that the sides 24, 26 and/or the bottom 28 can be alternatively provided with gussets.

The illustrated reclosable fastener 18 is in the form of a zipper extending along the mouth 30 opposite the sealed bottom 28 of the plastic bag 10. It is noted, however, that other suitable types of reclosable fasteners can be utilized within the scope of the present invention. The illustrated zipper includes a male track 32 fixedly secured along the top edge of first body panel 12 on the interior surface of the first body panel 12 and a female track 34 fixedly secured along the top edge of the second body panel 14 on the interior surface of the second body panel 14 and facing the male track 32. The male track 32 includes a male profile 36 and a downwardly depending flange 38. The female track 34 includes a female profile 40 adapted to cooperate with the male profile 36 in a known manner and a downwardly depending flange 42. The flanges 38, 42 are secured to the inner surfaces of the respective body panels 12, 14. The flanges 38, 42 are preferably thermally fused or welded to the body panels 12, 14 but alternatively can be secured in any other suitable manner. Preferably, the ends of the tracks 23, 34 are secured along with the sides 24, 26. It is noted that while the illustrated male and female tracks 32, 34 are connected to the respective body panels 12, 14 to form a single integral member, the male and female tracks 32, 34 can alternatively be unitarily formed with the respective body panels 12, 14 such as, for example, by extrusion or coextrusion.

The illustrated zipper further includes a slider 44 which is slidably mounted on the tracks 32, 34 for movement from a closed position at one side of the plastic bag 10 and an open position at the other side of the plastic bag 10. In the open position (shown FIGS. 1 and 2) the male and female profiles 36, 40 are disengaged from each other so that a user can gain access to the interior cavity 16 through the mouth 30. Movement of the slider 44 along the tracks 32, 34 from the open position to the closed position interlocks the male and female profiles 36, 40 so that the mouth 30 is sealed to restrict access to the interior cavity 16. It is noted that sliderless zippers can be utilized within the scope of the present invention.

The overlay strip 20 forms the header 22 which facilitates mounting, handling and filling the plastic bag 10. The overlay strip 20 overlays a portion of the first body panel 12 at the bottom 28 of the plastic bag 10 and overlaps the bottom 28 of the plastic bag 10, that is, the overlay strip 20 upwardly extends over a limited portion of the first body panel 12 and downwardly extends beyond the bottom 28 of the plastic bag 10. The overlay strip 20 laterally extends from one side 24 of the body panels 12, 14 to the other side 26 of the body panels 12, 14 and is secured to body panels 12, 14 at the sides 24, 26. The overlay strip 20 is preferably thermally fused or welded to the body panels 12, 14 and can be conveniently connected at the same time as securing the sides 24, 26 of the body panels 12, 14 together but alternatively can be secured in any other suitable manner. In the illustrated embodiment, the overlay strip 20 is secured to the body panels 12, 14 only at the side edges 46, 48 of the overlay strip 20 at the sides 24, 26 of the body panels 12, 16 but the overlay strip 20 can be connected to the body panels 12, 16 at other locations if suitable for a particular application of the present invention.

The overlay strip 20 is formed by a planer, flexible sheet of plastic material. The overlay strip can be formed by the same plastic material as the body panels or a different plastic material if particular material characteristics are suitable for a particular application of the present invention. The illustrated overlay strip 20 is formed by two layers or sheets 50 of plastic material which are connected by a fold 52 at the top end, that is, at the end overlapping the body panels 12, 14. It is noted that the overlay strip 20 can be formed by one or more sheets 50 of plastic material and the sheets 50 an be formed by separate individual pieces of plastic material and/or folded pieces of plastic material within the scope of the present invention.

A portion of the overlay strip 20 extending below the bottom 28 of the plastic bag forms the header or header panel 22. The header 22 is preferably detachable from the remainder of the overlay strip 20 such as by the illustrated score or perforation line 54 which is located generally parallel to and below the bottom 28 of the plastic bag 10 so that the header can be removed or detached from the plastic bag 10. The header 22 is preferably provided with openings 56 adapted to mount the plastic bag 10 to dispensing posts of a dispensing stand or frame. The illustrated header 22 is provided with openings 56 in the form of holes but other suitable openings 56 can be utilized such as, for example, slits or the like. Alternatively, the headers can be without openings and connected together and held by a header card such as disclosed within U.S. Pat. No. 5788,080, the disclosure of which is expressly incorporated herein in its entirety.

As best shown in FIG. 3, a plurality of plastic bags 10 are preferably formed into unitary packs for shipping and loading onto dispensing posts. The packs can be formed by stacking a plurality of the plastic bags 10 and then penetrating the stack at the headers 22 with a heated or ultrasonic pin or punch element to form apertures 58. The headers 22 in the stack are heat welded or ultrasonically welded together along edges of the apertures 58 to secure the plastic bags 10 together.

Figure 4:
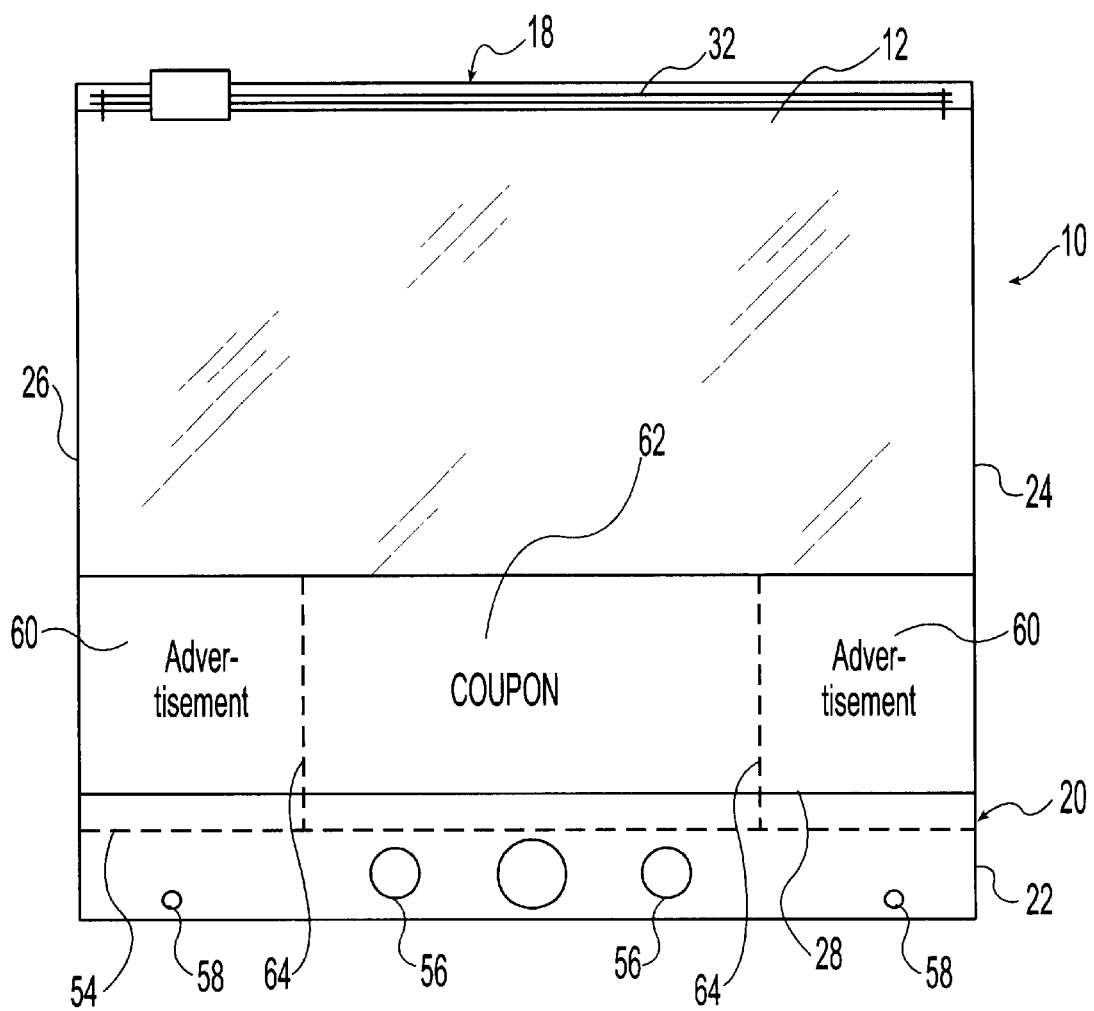
FIG. 4 is a rear elevational view of a variation of the plastic bag of FIGS. 1 and 2 wherein the overlay strip includes redeemable coupon and advertising indicia thereon.

FIG. 4 illustrates a variation of the overlay strip 20 described herein above wherein the portion of the overlay strip 20 not forming the header is provided with promotional or advertising messages or advertisements 60 and a redeemable coupon or premium 62. The advertising messages 60 and the coupon 62 can be marked or printed directly onto the surface of the overlay strip 20 using any suitable printing method or can alternatively be provided by labels adhered to the surface of the overlay strip 20. The advertising or promotional messages 60 can be used to promote the store or sold to others to at least partially offset the cost of the plastic bags 10. The coupon 62 can be a store redeemable coupon for either items purchased in the plastic bag 10 items relating to the items purchased in the plastic bag 10, or any other item. If the plastic bag 10 is used for deli-meats, for example, the coupon 62 can be for bread products, cheese, or condiments to prompt the purchaser to buy other products which the purchaser may not otherwise purchase. The illustrated coupon 62 is provided with scored or perforated lines 64 so that the coupon 62 can be easily separated from the remainder of the overlay strip 20 by the purchaser. It is noted that the overlay strip 20 can have entirely advertising messages 60 of any quantity, entirely coupons 62 of any quantity, and any combination of advertising messages 60 and coupons 62. It is also noted that the overlay strip 20 can alternatively be entirely used for advertising messages 60 and/or coupons 62 without forming a header 22.

FIG. 5 illustrates an overlay strip 20' which is a variation of the overlay strip 20 described in detail hereinabove wherein the overlay strip 20' is formed by a single web or sheet 60 of material. The overlay strip 20' illustrates that the overlay strip 20 can be formed by one or more layers of the sheets 60 depending on the requirements of a particular application of the present invention.

FIG. 6 illustrates a plastic bag 10' which is a variation of the plastic bag 10 described in detail hereinabove wherein the overlay strip 20 is secured to the face of the first body panel 12 at a location between the sides 24, 26. The illustrated overlay strip 20 is secured to the body panel 12 with adhesive 66. The adhesive 66 can be of any suitable type for the particular application of the invention. It is also noted that the overlay strip 20 can alternatively be secured to the face of the body panel 12 in other manners such as heat or ultrasonic welding.

Figure 8:
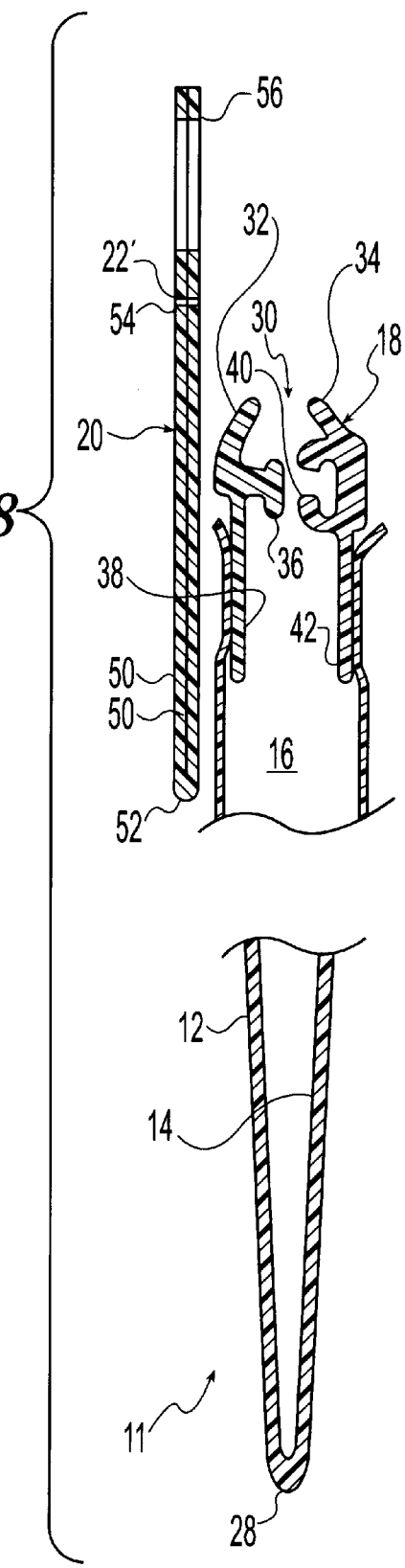
FIG. 8 is a fragmented cross-sectional view taken along line 8—8 of FIG. 7.
Figure 7:
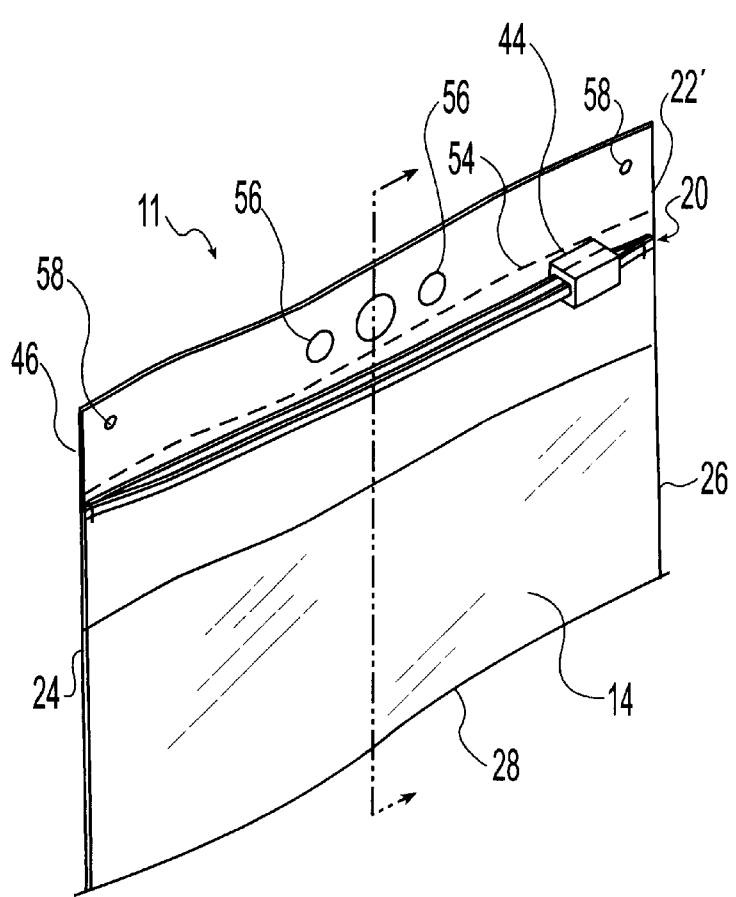
FIG. 7 is a perspective view of a plastic bag with a header formed by an overlay strip according to a second embodiment of the present invention.

FIGS. 7 and 8 illustrate a plastic bag 11 according to a second embodiment the present invention wherein like reference numbers are used for like structure. The plastic bag 11 is substantially similar to the plastic bag 10 of the first embodiment described hereinabove except that the overlay strip 20 is secured at the top of the plastic bag 11 near the mouth 30 rather than at the bottom 28 of the plastic of a plastic bag 11. Constructed in this manner the plastic bag 11 has a top header 22' rather than a bottom header 22. The overlay strip 20 is located adjacent the top portion of the body panels 12, 14 and upwardly extends beyond the mouth 30 and the reclosable fastener 18. The score or perforation line 54 is located parallel to and slightly above the top edges of the body panels 12, 14. Note that the overlay strip 20 is preferably secured to the body panels 12, 14 at the sides 24, 26 so that the overlay strip is free to move away from the side panels 12, 14 between the sides 24, 26 and provide clearance space for operation of the reclosable fastener 18. Particularly, when the reclosable fastener includes the slider 44. It is noted that if the overlay strip 20 is secured between the sides 24, 26 as discussed hereinabove with regard to FIG. 6, the adhesive 66 or other suitable spacer should be adapted so that there is suitable clearance space for operation of the reclosable fastener 18.

It is noted that that each of the features of the various embodiments and variations described hereinabove can be utilized with each of the other embodiments and variations. For example, the advertisement 60 and/or coupon 62 (FIG. 4) and/or the single sheet overlay strip 20' (FIG. 5) can utilized with the plastic bag 11 having the top header 22' (FIGS. 7 and 8).

From the foregoing disclosure and detailed description of certain preferred embodiments, it is also apparent that various modifications, additions and other alternative embodiments are possible without departing from the true scope and spirit of the present invention. For example, while the illustrated embodiments have sides and bottoms which are ungussetted, any and/or all of them can be gussetted within the scope of the present invention. Also, while the illustrated embodiments each have headers with openings for dispensing posts, the headers can be secured to header cards within the scope of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip overlays at least a portion of said body panels and extends beyond said body panels;

wherein said overlay strip includes a header portion having at least one opening for mounting the plastic bag to a dispensing post; and wherein said overlay strip includes a perforation line such that the header is removable from the remainder of the overlay strip.

2. The plastic bag according to claim 1, wherein said overlay strip includes at least one advertisement.

3. The plastic bag according to claim 1, wherein said overlay strip includes at least one coupon.

4. The plastic bag according to claim 3, wherein said overlay strip includes at least one perforation line such that the coupon is removable from the remainder of the overlay strip.

5. The plastic bag according to claim 1, wherein said overlay strip extends beyond said body panels at said bottom.

6. The plastic bag according to claim 1, wherein said overlay strip extends beyond said body panels at said mouth.

7. The plastic bag according to claim 1, wherein said reclosable fastener is a zipper including a slider.

8. The plastic bag according to claim 1, wherein said overlay strip includes a plurality of opposed sheets.

9. The plastic bag according to claim 1, wherein said overlay strip is secured to said body panels at said sides and to one of said body panels at a location between said sides.

10. The plastic bag according to claim 9, wherein said overlay strip is secured to said body panels at a location between said sides with adhesive.

11. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip overlays at least a portion of said body panels and extends beyond said body panels; and wherein said overlay strip is secured to said body panels only at said sides.

12. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip includes a header portion having at least one opening for mounting the plastic bag to a dispensing post and a perforation line such that the header is removable from the remainder of the overlay strip; and wherein said overlay strip includes at least one advertisement.

13. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip includes a header portion having at least one opening for mounting the plastic bag to a dispensing post and a perforation line such that the header is removable from the remainder of the overlay strip; and wherein said overlay strip includes at least one coupon.

14. The plastic bag according to claim 13, wherein said overlay strip includes at least one perforation line such that the coupon is removable from the remainder of the overlay strip.

15. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip includes a header portion having at least one opening for mounting the plastic bag to a dispensing post and a perforation line such that the header is removable from the remainder of the overlay strip; and wherein said reclosable fastener is a zipper including a slider.

16. The plastic bag according to claim 15, wherein said overlay strip overlays at least a portion of said body panels and extends beyond said body panels.

17. The plastic bag according to claim 16, wherein said overlay strip extends beyond said body panels at said bottom.

18. The plastic bag according to claim 16, wherein said overlay strip extends beyond said body panels at said mouth.

19. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip includes a header portion having at least one opening for mounting the plastic bag to a dispensing post and a perforation line such that the header is removable from the remainder of the overlay strip; and wherein said overlay strip includes a plurality of opposed sheets.

20. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip includes a header portion having at least one opening for mounting the plastic bag to a dispensing post and a perforation line such that the header is removable from the remainder of the overlay strip; and wherein said overlay strip is secured to said body panels only at said sides.

21. The plastic bag according to claim 20, wherein said overlay strip is secured to said body panels at said sides and to one of said body panels at a location between said sides.

22. The plastic bag according to claim 21, wherein said overlay strip is secured to said body panels at a location between said sides with adhesive.

23. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip overlays at least a portion of said body panels and extends beyond said body panels; and wherein said overlay strip includes a header portion having at least one opening for mounting the plastic bag to a dispensing post, a perforation line such that the header is removable from the remainder of the overlay strip, and at least one advertisement.

24. A plastic bag comprising, in combination:

first and second opposing body panels fixedly connected to each other along a pair of sides and a bottom bridging the pair of sides to form a receptacle space having a mouth formed opposite said bottom;

a reclosable fastener extending along said mouth;

an overlay strip fixedly connected to said body panels at said sides of said body panel;

wherein said overlay strip overlays at least a portion of said body panels and extends beyond said body panels; and wherein said overlay strip includes a header portion with at least one opening for mounting the plastic bag to a dispensing post, at least one coupon, and perforation lines such that both the header and the at least one coupon are separately removable from the remainder of the overlay strip.

* * * * *